(12) United States Patent
Al-Housami

(10) Patent No.: US 7,050,814 B2
(45) Date of Patent: May 23, 2006

(54) MOBILE RADIO TELECOMMUNICATION SYSTEM WITH IMPROVED UPLINK RESOURCE ALLOCATION

(75) Inventor: Housam Maher Al-Housami, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 607 days.

(21) Appl. No.: 09/782,359

(22) Filed: Feb. 14, 2001

(65) Prior Publication Data

US 2001/0016497 A1    Aug. 23, 2001

(30) Foreign Application Priority Data

Feb. 15, 2000  (EP)  .................................. 00301166

(51) Int. Cl.
*H04Q 7/20* (2006.01)
*H04Q 7/38* (2006.01)

(52) U.S. Cl. ................ 455/452.1; 455/452.2; 455/453; 455/450; 455/509; 455/422.1; 455/403; 370/328; 370/329

(58) Field of Classification Search ................ 455/452, 455/453, 450–451, 509, 63, 522, 422.1, 67.3, 455/501, 517, 454, 426.1, 466, 500, 503, 455/67.11, 464, 455, 452.1, 452.2, 403, 445; 370/329, 328, 494, 495

See application file for complete search history.

(56) References Cited

U.S. PATENT DOCUMENTS

| 5,805,993 | A | * | 9/1998 | Cherpantier et al. ...... 455/422.1 |
| 6,031,827 | A | * | 2/2000 | Rikkinen et al. ............ 370/329 |
| 6,374,112 | B1 | * | 4/2002 | Widegren et al. ........... 455/452 |
| 2002/0051433 | A1 | * | 5/2002 | Affes et al. ................. 370/335 |
| 2003/0003921 | A1 | * | 1/2003 | Laakso ........................ 455/453 |

FOREIGN PATENT DOCUMENTS

| EP | 0 767 548 A2 | 9/1996 |
| EP | 0 939 566 A1 | 8/1998 |
| WO | WO 98/24199 | 6/1998 |
| WO | WO 99/53700 | 10/1999 |

OTHER PUBLICATIONS

European Search Report, dated Oct. 30, 2000.

* cited by examiner

*Primary Examiner*—Keith T. Ferguson

(57) ABSTRACT

In a heterogeneous mobile telecommunication system such as the Universal Mobile Telephone system, a system and method of resource allocation comprising the steps of determining the current proportion of each rate traffic for a telecommunication cell; the base transceiver station controlling the cell then applying a predetermined threshold to the loading level in that cell.

9 Claims, 3 Drawing Sheets

MOBILE RADIO TELECOMMUNICATION SYSTEM WITH IMPROVED UPLINK RESOURCE ALLOCATION

CROSS-REFERENCE TO RELATED APPLICATION

This application claims priority of European Patent Application No. 00301166.5, which was filed on Feb. 15, 2000.

BACKGROUND OF THE INVENTION

1. Field of the Invention

This invention relates to a mobile radio telecommunication system; in such a system, the method used to allocate resources in the uplink, i.e. in the links to the mobile users, determines the number of channels which can be simultaneously active in any telecommunications cell. Limits are set which may be conservative so as to maintain the stability of the system, and also to ensure that the service provided stays below the maximum outage level allowed in the network.

2. Related Art

In a system operated by Code Division Multiple Access (CDMA) in which traffic is homogeneous, e.g. it is all voice traffic, and there is a fixed number of channels, the number of simultaneous links in any telecommunications cell or telecommunications section can be hard limited, i.e. a definite number can be set.

In a system such as the Universal Mobile Telephone System (UMTS), which is a heterogeneous system, i.e. the traffic is of a mixed nature, and there is no fixed number of channels, hard limiting the number of communications links would lead to a very unstable performance. Also, it would be necessary to change the hard limit and to decrease the number of links, as the individual data rate of traffic increased, i.e. as there was less spreading gain.

In a wideband system the cell loading is often measured as the "interference above noise floor". That is, any active mobile user will be generating some amount of interference in the network and hence increasing the loading in the network. The noise floor is the interference level when there are no active users in the system.

An improved method of resource allocation suitable for application to a heterogeneous telecommunications system is desired.

SUMMARY OF THE INVENTION

According to the invention, in a wideband mobile radio telecommunication system having heterogeneous services with different rates, a method of resource allocation characterized by the steps of determining the current proportions of each rate traffic in a telecommunications cell; and applying a threshold to the loading level in the cell in accordance with said determined proportion.

Also according to the invention, a wideband mobile radio telecommunications system comprising a core network, a plurality of radio network controllers each controlling a plurality of base transceiver stations, characterized in that each base transceiver station is arranged to determine intermittently the proportions of each rate traffic in a cell controlled by the base transceiver station; and each base transceiver station is arranged to apply a variable threshold to the loading level in each cell.

BRIEF DESCRIPTION OF THE DRAWINGS

The invention will be described with reference to the accompanying drawings in which.

DETAILED DESCRIPTION OF THE PREFERRED EMBODIMENT

Figure 1:
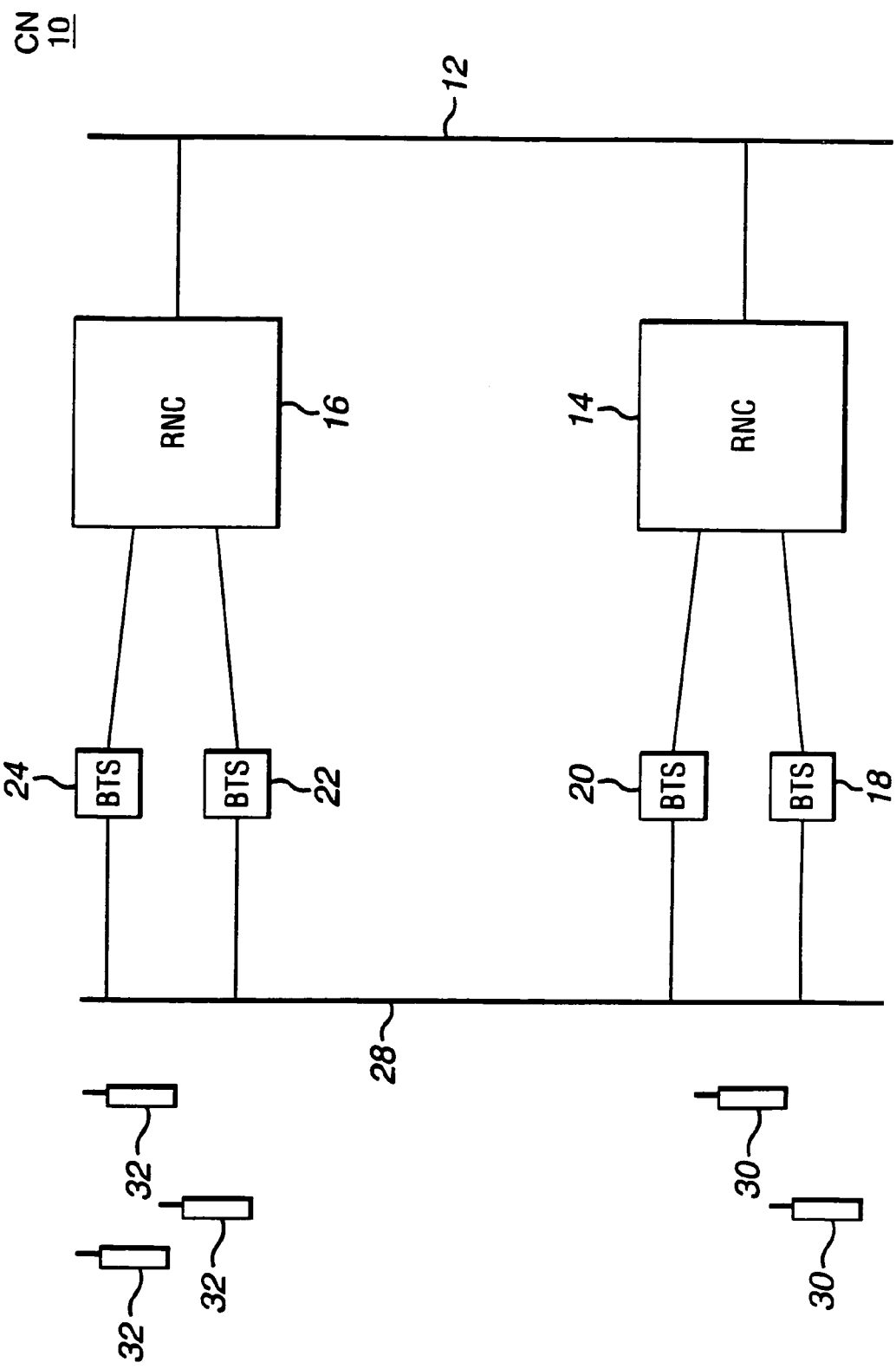
FIG. 1 is a schematic diagram of a UMTS system.

In the Universal Mobile Telephone System illustrated in FIG. 1, a Core Network (CN)10 has an interface 12 with a plurality of Radio Network Controllers (RNC) 14, 16, each controlling a plurality of Base Transceiver Stations (BTS) 18, 20, 22, 24. For simplicity only two RNCs each controlling two BTSs are shown. The BTSs interface through a radio interface 28 with a number of mobile users 30, 32.

Figure 2:
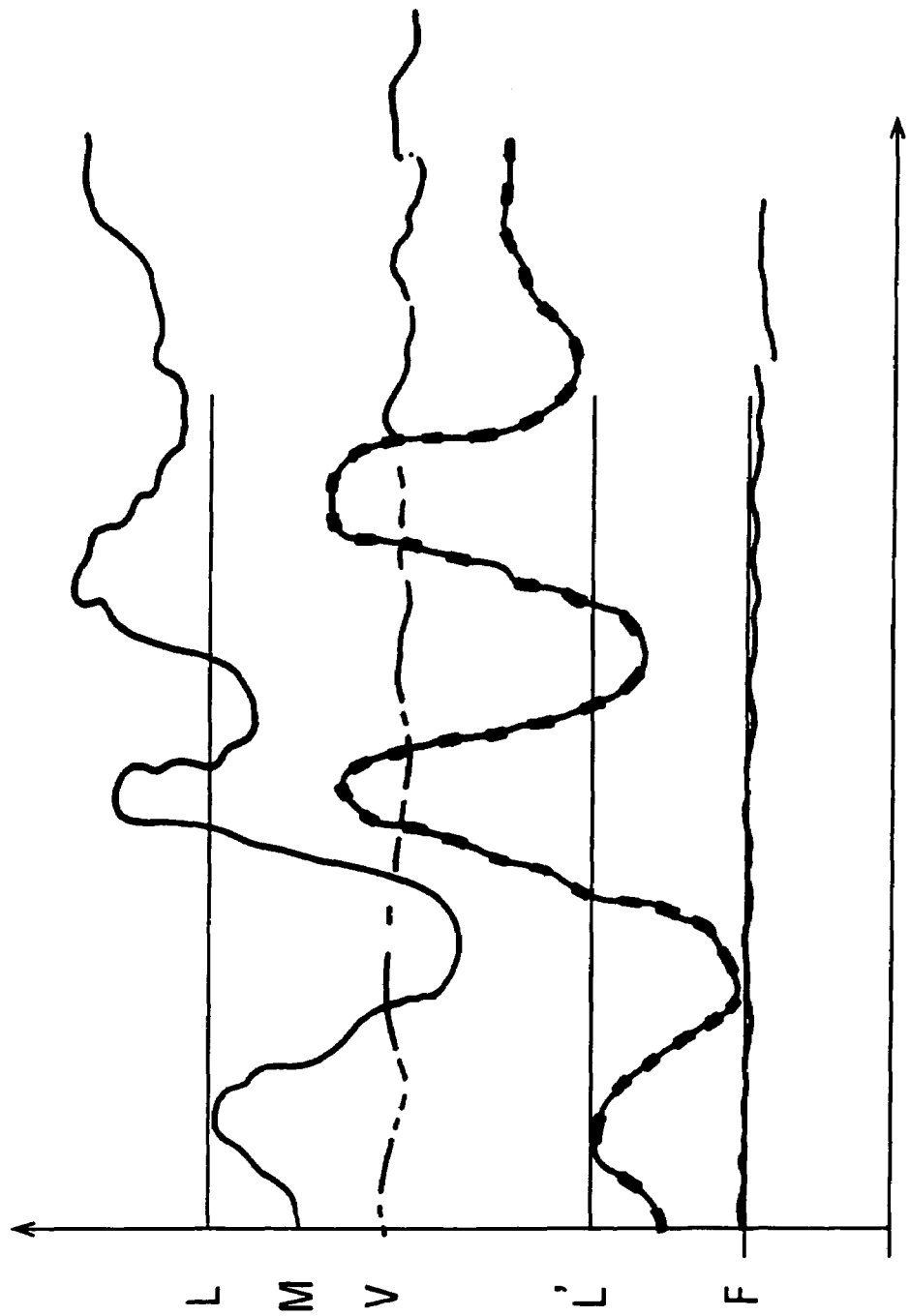
FIG. 2 indicates temporal loading variations in a telecommunication cells.

Each BTS 18, 20, 22, 24 is arranged to monitor the loading in the telecommunications cell it controls. Referring now to FIG. 2, in each cell there is a noise floor F, present when no users are active, and each BTS measures the interference level above this floor, which is proportional to the load in its cell. The measurement is based on the Received Signal Strength Indicator RSSI which gives a measure of the total interference in a cell. Each BTS has a current load limit and if this limit is reached, the next request for resource, i.e. for a new connection to a mobile, is refused by the BTS.

If the traffic in the cell is voice, the actual loading varies relatively little in the short term, as indicated in FIG. 2 by the line V. It is therefore possible to set a fixed limit L which will rarely be exceeded by voice traffic. Since the loading variations in the pure voice case are minimal, this threshold translates to a fixed number of maximum allowed trunks, hence users.

If however the traffic is a mixture of voice and data, as shown by the line M there may be substantial periods when actual instantaneous loading would exceed the fixed loading threshold limit as well as periods during which traffic is well below the fixed limit. This is due to the bursty nature of high rate users as well as the low spreading gain associated with high rate channels. During the periods of increased loading above line L, (the threshold), some users will be blocked or dropped in the middle of their calls, making the probability of blocking higher as the time spent above the line L is longer. This means that a lower loading threshold L' must be set in such a way that the system will operate below the required loading level L. Thus when the system is carrying homogeneous traffic it will operate at a lower loading level, making the system less efficient. Line F indicates the noise floor.

In the inventive method and apparatus, a dynamic limit is set which varies in accordance with the proportion of high rate terminals which are active in a particular telecommunications cell.

Figure 3:
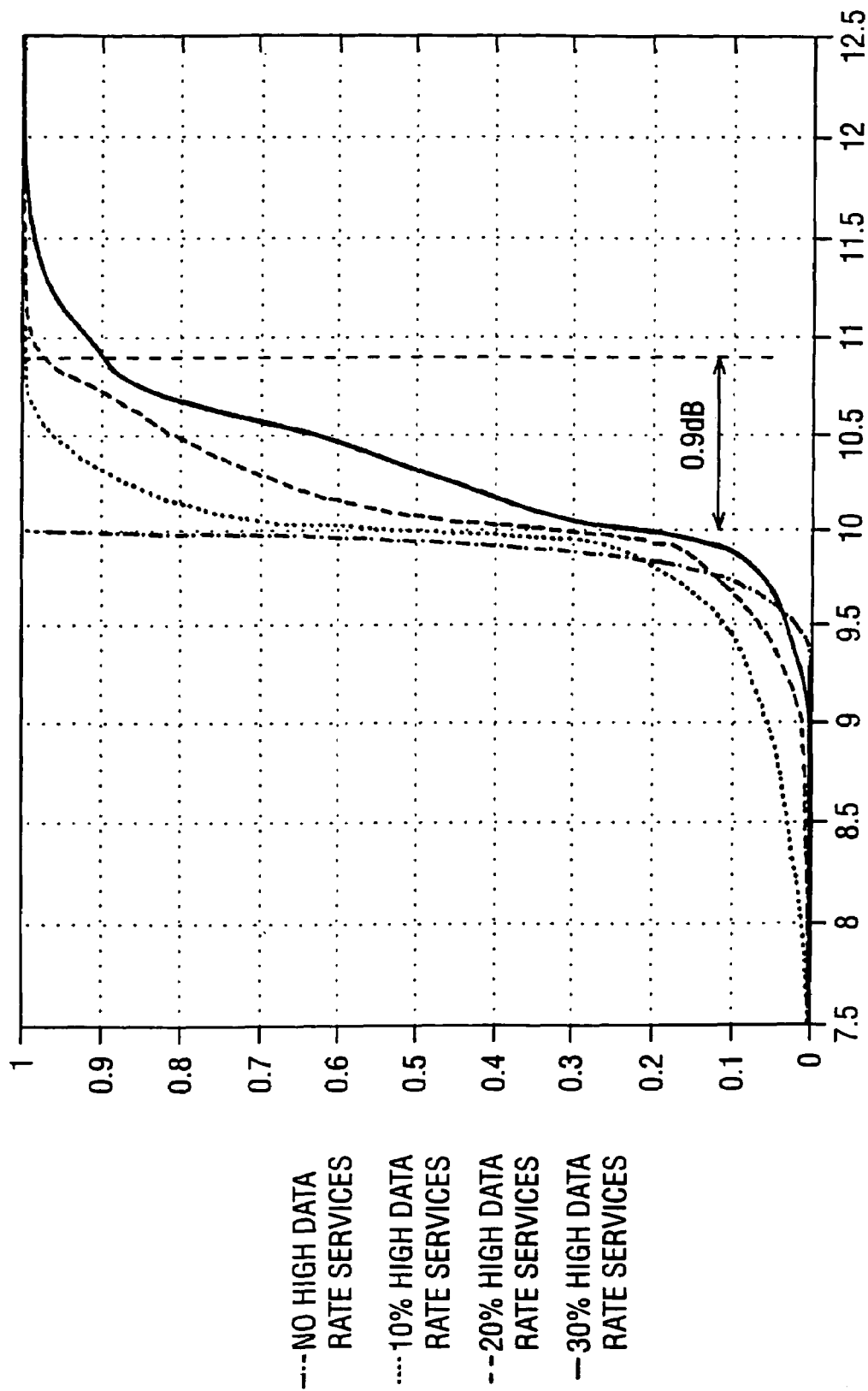
FIG. 3 is a graph of cumulative distribution functions of the instantaneous loading with different proportions of high data rate services.

FIG. 3 is a plot of the modelled Cumulative Distribution Functions (CDF) of loading in a cell with different fractions of high and low data rate services.

The dynamic traffic was modelled using a Poisson arrival rate and inverse exponential holding time using the Inverse Transfer Method. The CDF for the Poissonious and inverse exponential distributions was used to find the number of arrivals and the values for initial holding times. The results presented here over a period of 10,000 seconds with 1 second sampling time.

Two types of service were simulated, 8 kbps voice with 0.5 activity and 144 kbps data with 1.0 activity. Four different mixes were modeled and the four plots show the CDFs for no high data rate service and for 10%, 20% and 30% high data rate services. A value of 10 dB loading threshold (interference level above the noise floor) was used in the model.

FIG. 3 shows that for pure voice traffic, shown by the chain-dotted line, the instantaneous loading rarely exceeds the 10 dB threshold. For 10% high data rate and 90% voice, shown by the dotted line, there is some loading which exceeds the threshold, while for 20% high data rate (broken line) and 30% high data rate (full line) the threshold is highly likely to be exceeded.

The loading values have a wide distribution; if a requirement is set that the system should be loaded below 10 dB for a certain percentage of time, another threshold higher than 10 dB should be set.

For example, suppose a threshold must be loaded below 10 dB 99.9% of the time, for the 10% high data rate loading; the threshold then needs to be decreased from 10 dB to 10−0.9=9.1 dB.

By extensive simulation, it is possible to find the back-off values for all possible mixes of traffic.

Instead of simply setting a fixed threshold which is appropriate for a situation in which many high data rate terminals are active, it is now proposed that a dynamic threshold is set, depending on the actual mixture of active terminals in a cell. This information is already available for each cell in each BTS 18, 20, 22, 24 via the measurements of RSSI (Received Signal Strength Indicator), but is currently not used in the way now proposed.

Thresholds can be selected so that, for the traffic mix currently applicable, traffic is below the threshold for a selected proportion of the time. A stable system can then be provided when there is a higher proportion of high data rate users, while allowing a greater number of connections during periods when fewer high data rate users are active.

An appropriate position for the setting of a dynamic loading threshold is within each RNC 14, 16. A mobile in a cell controlled by a BTS consumes some of the loading in its serving cell as well as in neighboring cells, so for effective control, a set of BTSs should be controlled, and allocated thresholds, by the controlling RNC. A cell currently experiencing a loading peak can then be allocated appropriate resource, but is also returned to a more stable condition as soon as the loading peak is reduced.

In such an arrangement, each BTS 18, 20, 22, 24 will send intermittently to its controlling RNC 14, 16 a signal indicating the proportions of high and low data rate users currently active within a cell controlled by that BTS. The RNC 14, 16 can then intermittently allocate to the BTSs it controls an appropriate loading threshold, taking into account the traffic in cells controlled by adjacent BTSs. The periods between the intermittent signaling and allocating is selected to be appropriate to the network. The RNC can maintain a table of threshold values for specific mixes of services, such as those illustrated in FIG. 3, and can select a threshold for a cell to maintain optimum network operation.

The invention claimed is:

1. In a wideband mobile radio telecommunications system, a method of resource allocation comprising the steps of:
   determining the current relative proportions of traffic of each rate in the system, wherein the system offers heterogeneous services with different rates; and
   applying a threshold to the loading level in the system, the threshold being dependent upon the determined relative proportions.

2. A method according to claim 1, wherein the relative proportion of high rate users is determined from a received signal strength indication for the system.

3. A method according to claim 2, wherein the determining step is performed in a base transceiver station for controlling the system.

4. A method according to claim 3, wherein said base transceiver station sends to a central radio network controller the determined current relative proportions.

5. A method according to claim 4, wherein said applied threshold is variable.

6. A method according to claim 5, wherein said variable threshold is allocated to each cell in the system by the radio network controller.

7. A method according to claim 6, wherein the radio network controller maintains a table of threshold values for specific mixes of services and selects a threshold to maintain optimum network operation.

8. A wideband mobile radio telecommunications system comprising a core network, and a plurality of radio network controllers each controlling a plurality of base transceiver stations, having heterogeneous services of different rates providing traffic of various rates; wherein each base transceiver station is arranged to determine intermittently the relative proportions of traffic of each rate in a cell controlled by the base transceiver station; and each base transceiver station is arranged to apply a variable threshold to the loading level in the cell, the variable threshold being dependent upon the determined relative proportions.

9. A system according to claim 8, wherein each base transceiver station is arranged to send to the radio network controllers which controls it the base transceiver station a signal indicating the relative proportions and to receive from the radio network controller a variable loading limit to be applied.

* * * * *